United States Patent [19]

Potash

[11] 4,433,391
[45] Feb. 21, 1984

[54] BUFFERED HANDSHAKE BUS WITH TRANSMISSION AND RESPONSE COUNTERS FOR AVOIDING RECEIVER OVERFLOW

[75] Inventor: Hanan Potash, La Jolla, Calif.

[73] Assignee: Burroughs Corporation, Detroit, Mich.

[21] Appl. No.: 293,494

[22] Filed: Aug. 17, 1981

[51] Int. Cl.³ .................. G06F 3/04; G06F 13/00
[52] U.S. Cl. ........................ 364/900; 340/825.65
[58] Field of Search .......... 364/200, 900; 370/85, 370/91; 340/825.65

[56] References Cited

U.S. PATENT DOCUMENTS

| | | | |
|---|---|---|---|
| 4,047,157 | 9/1977 | Jenkins | 364/200 |
| 4,145,755 | 3/1979 | Suzuki et al. | 364/900 |
| 4,156,796 | 5/1979 | O'Neal et al. | 178/3 |
| 4,208,713 | 6/1980 | Berg | 364/200 |
| 4,228,500 | 10/1980 | Webster | 364/900 |
| 4,258,418 | 3/1981 | Heath | 364/200 |
| 4,296,477 | 10/1981 | Hutson | 364/900 |
| 4,298,954 | 11/1981 | Bigelow et al. | 364/900 |
| 4,342,995 | 8/1982 | Shima | 340/825.5 |
| 4,353,128 | 10/1982 | Cummiskey | 370/44 |
| 4,378,594 | 3/1983 | Kenyon | 364/900 |

*Primary Examiner*—James D. Thomas
*Assistant Examiner*—Archie E. Williams, Jr.
*Attorney, Agent, or Firm*—Charles J. Fassbender; Kevin R. Peterson

[57] ABSTRACT

A digital system includes a digital bus, a sending device coupled to the bus for sending digital data words over the bus, and a receiving device coupled to the bus spaced apart from the sending device for receiving the sent words. Included in the receiving device is a storage circuit for temporarily storing multiple words from the sending device and a circuit for transmitting a response signal to the sending device each time a word is removed from the storage circuit. Included in the sending device is a control circuit for temporarily suspending the sending of the words over the bus whenever the number of words sent to the receiving device minus the number of response signals from the receiving device equals a predetermined number.

9 Claims, 7 Drawing Figures

BUFFERED HANDSHAKE BUS WITH TRANSMISSION AND RESPONSE COUNTERS FOR AVOIDING RECEIVER OVERFLOW

BACKGROUND OF THE INVENTION

This invention relates to digital devices which communicate to each other over a bus; and more particularly, it relates to the input/output mechanisms in those devices which perform the actual transmitting of words to and receiving of words from the bus.

As an example, one of the devices can be a digital computer; and the other device can be a disk. In that case, the mechanism with which the present invention is concerned is that portion of the digital computer which places words on the bus and that portion of the disk which receives words from the bus.

One widely used prior art input/output interface for transmitting digital words over a bus is illustrated in FIG. 1B. This prior art interface is used, for example, in the input/output channels of the IBM 360 family of computers. See FIG. 52B of U.S. Pat. No. 3,400,371.

With the FIG. 1A interface, the transmitting device includes transmitters 10 and 11, and receiver 12; and the receiving device includes receivers 13 and 14, and transmitter 15. In operation, the data word to be transmitted is applied to the input of transmitter 10 and at the same time, a signal SEROUT$_T$ is forced high at the input of transmitter 11.

Those two signals then pass through their respective transmitters, propagate along the bus, and pass through their respective receivers 13 and 14. This occurs during a time interval $\Delta T$. In other words, time interval $\Delta T$ is the delay through a transmitter plus the delay across the bus plus the delay through a receiver.

After the receiving device has completed its reception of the data, it forces a signal SERIN$_T$ high at the input of transmitter 15. That signal then passes through transmitter 15, propagates along the bus, and passes through receiver 14 where it becomes signal SERIN$_R$. This also occurs over time interval $\Delta T$.

In response to signal SERIN$_R$ going high, the sending device removes the word that it is transmitting and forces signal SEROUT$_T$ to a low. Then, after another delay of $\Delta T$, signal SEROUT$_R$ goes low in the receiving device. In response, the receiving device forces signal SERIN$_R$ low; and after delay $\Delta T$, signal SERIN$_R$ goes low in the sending device. Then the sending device can now send another word over the bus.

One problem with this input/output interface is that the maximum rate at which words can be sent is limited by $4 \times \Delta T$. In other words, at least $4 \times \Delta T$ seconds must elapse for each word that is transmitted. Thus, for long buses, or slow transmitters, or slow receivers, the maximum rate of transmission is severely limited.

To overcome this problem, the FIG. 1A-1B input/output interface can be modified such that the transmitting device places a new word on the bus in synchronization with every transition of signal SEROUT$_T$. Thus, word number one is placed on the bus in synchronization with the high to low transition of signal SEROUT$_T$; word number three is placed on the bus in synchronization with the next low to high transition of signal SEROUT$_T$; etc.

This modified input/output interface is known in the art as a "half handshake", whereas the previously described interface is known as a "full handshake". With the half handshake interface, the minimum time required to transmit one word on the bus is reduced from $4 \times \Delta T$ to $2 \times \Delta T$. But a new problem with the half handshake interface is that the transmitting device must be capable of sending words on both edges of the SEROUT$_T$ signal and the receiving device must be capable of receiving data words on both edges of the SEROUT$_R$ signal. This increases the complexity of those devices. Also, the time interval of $2 \times \Delta T$ per word is still undesirably long for systems having a long bus or having slow transmitters or slow receivers.

One other prior art input/output interface, by RCA, is illustrated in FIG. 2A; and its operation is illustrated in FIG. 2B. With this interface, the sending device includes transmitters 20, 22, and 23 and includes a receiver 21; while the receiving device includes receivers 24, 26, and 27, and includes a transmitter 25.

In operation, as illustrated in FIG. 2B, the receiving device raises signal REQ$_T$ to tell the sending device that it requests some data. Signal REQ$_T$ passes through transmitter 25, along the bus, and through receiver 21 where it becomes signal REQ$_R$. Then, in response to signal REQ$_R$ being high, the sending device begins sending data back to the receiving device.

Word number one is sent by the sending device by placing that word on the bus and by raising signal SER$_T$ to a high in synchronization with a clock signal CK$_T$. These signals all pass through their respective transmitters, travel along the bus, and pass through their respective receivers. Thus, after the delay of $\Delta T$, signal SER$_R$ goes high in the receiving device; and that tells the receiving device that it is being sent a word of data.

In response, the receiving device must then indicate whether it wants another word of data or whether data transmission should stop. If another word of data is requested, then the receiving device leaves signal REQ$_T$ high; but if it wants data transmission to stop, it forces signal REQ$_T$ low.

Signal REQ$_T$ then passes through transmitter 25, travels along the bus, and passes through receiver 21 where it becomes signal REQ$_R$. This occurs over time interval $\Delta T$. Signal REQ$_T$ is monitored by the sending device; and if it stays high, then another word of data is sent to the receiving device.

This input/output interface is an improvement over the half handshake because all data transmissions occur only on the rising edge of a signal, (i.e., signal CK). However, the minimal time interval for transmitting one word of data is still limited by the factor $2 \times \Delta T$ because for each word transmitted, signal SER$_T$ must propagate from the sending device to the receiving device, and signal REQ$_T$ must propagate from the receiving device back to the sending device. Otherwise, the sending device will not know when to stop sending data. Thus, this input/output interface is undeniably slow.

Accordingly, it is a primary object of this invention to provide a digital system wherein data words are transmitted between digital devices over a bus at less than $2 \times \Delta T$ seconds per word of data.

BRIEF SUMMARY OF THE INVENTION

This object and others are achieved in accordance with the invention by a digital system which includes a digital bus, a sending device coupled to the bus for sending digital data words over the bus, and a receiving device coupled to the bus spaced apart from the sending device for receiving the sent words. Included in the receiving device is a storage circuit for temporarily storing multiple words from the sending device; and also included is a circuit for transmitting a response signal to the sending device each time a word is removed from the storage circuit. Further, the sending device includes a control circuit for temporarily suspending the sending of the words over the bus whenever the number of words sent to the receiving device minus the number of response signals from the receiving device equals a predetermined number.

BRIEF DESCRIPTION OF THE DRAWINGS

Various features and advantages of the invention will best be understood by reference to the following detailed description and accompanying drawings wherein.

DETAILED DESCRIPTION OF THE INVENTION

Figure 1A:
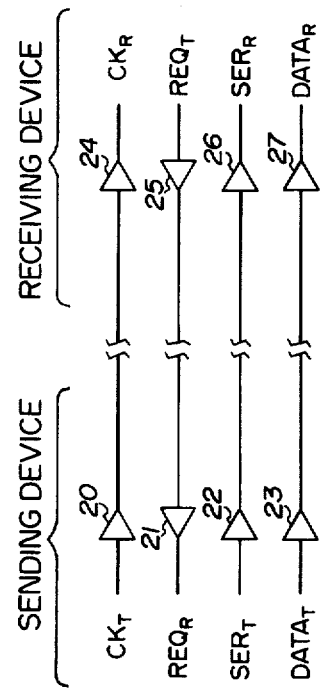
FIG. 1A is a logic diagram of one prior art input/output interface for sending digital words on a bus.
Figure 1B:
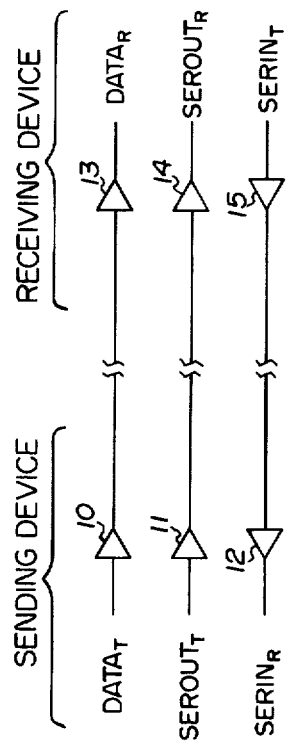
FIG. 1B is a timing diagram illustrating the operation of the FIG. 1A input/output interface.
Figure 2A:
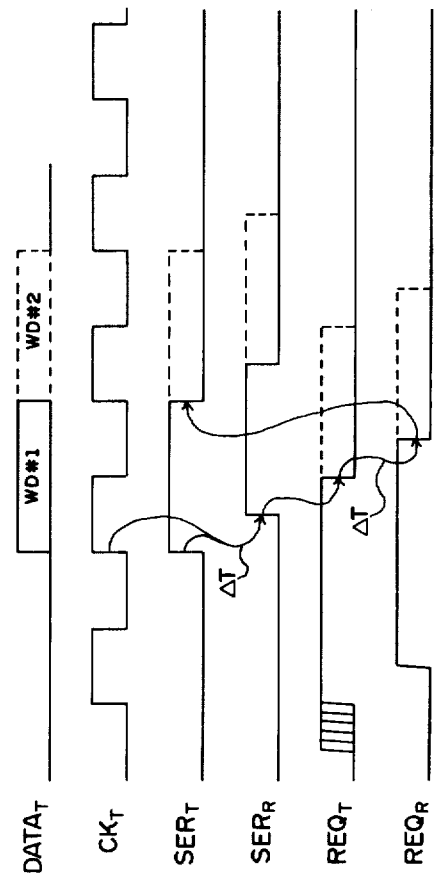
FIG. 2A is a logic diagram of another prior art input/output interface for sending digital words on a bus.
Figure 2B:
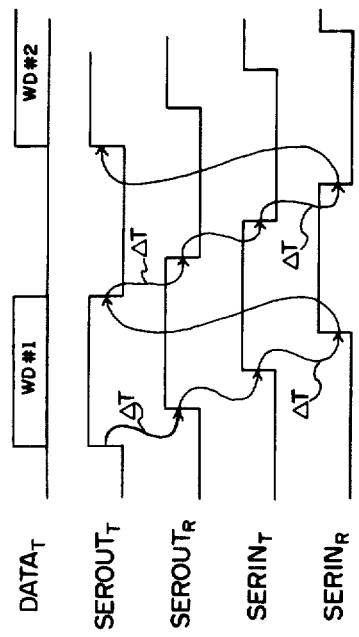
FIG. 2B is a timing diagram illustrating the operation of the FIG. 2A input/output interface.
Figure 3:
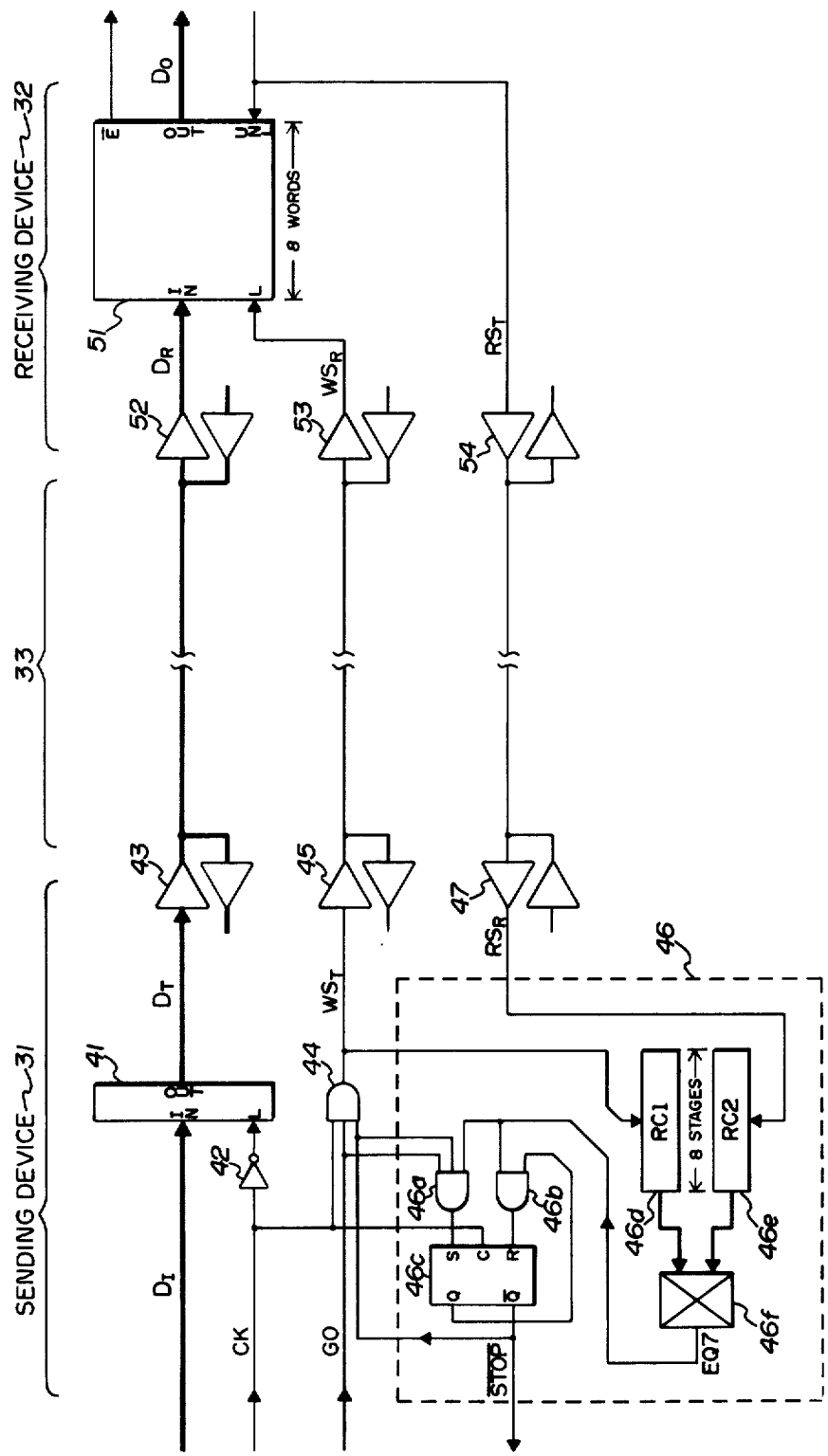
FIG. 3 is a logic diagram of the input/output circuitry of a digital system which is constructed in accordance with one preferred embodiment of the invention.

One preferred embodiment of a digital system that is constructed according to the invention will now be described in detail in conjunction with FIGS. 3–5. This digital system, as illustrated in FIG. 3, includes a digital device 31 that sends digital words to another digital device 32 over a digital bus 33. And this transmission occurs in a manner which eliminates the problems that were pointed out in the background portion of this disclosure In the illustrated preferred embodiment of FIG. 3, device 31 includes a register 41, an inverter 42, and a plurality of transmitters 43. These components provide a means for sending words of data on bus 33. One word of data input signals $D_I$ is loaded into register 41 whenever a clock signal CK at the input of inverter 42 makes a low to high transition; and that word in register 41 forms the data inputs $D_T$ to the bus transmitters 43.

A write strobe $WS_T$ is also sent by device 31 to the receiving device along with each word that is sent. That write strobe provides a signal by which the receiving device synchronizes the taking of data from the bus. Write strobe $WS_T$ is generated by an AND gate 44, a transmitter 45, and a control circuit 46 which will be described in detail shortly.

By comparison, the receiving device 32 includes a first-in first-out queue 51 for temporarily storing eight words of data from the bus. Those data words are received from the bus by receivers 52; and they are clocked into the queue by the falling edge of the accompanying write strobes, which are received by a receiver 53.

A high state of a signal $\overline{E}$ from queue 51 indicates when the queue is not empty. That is, a high $\overline{E}$ signal indicates the presence of a word in the queue. And words are removed from queue 51 on a first-in first-out basis by applying a high-to-low signal transition on an unload input UNL of the queue.

Whenever a word is removed from queue 51, the receiving device generates a response strobe $RS_T$ at the input of a transmitter 54. That response strobe is then sent over bus 33 to a receiver 47 in the transmitting device; and from there, the response strobe is sent to control circuit 46.

In the illustrated preferred embodiment, control circuit 46 is comprised of a pair of AND gates 46a and 46b, a clocked set-reset flip-flop 46c, a pair of eight-stage ring counters 46d and 46e, and a compare circuit 46f. Counter 46d monitors the number of write strobes sent by device 31; counter 46e monitors the number of response strobes sent by device 32; and further write strobes are inhibited when the difference between those two numbers equals a preselected value.

Figure 4:
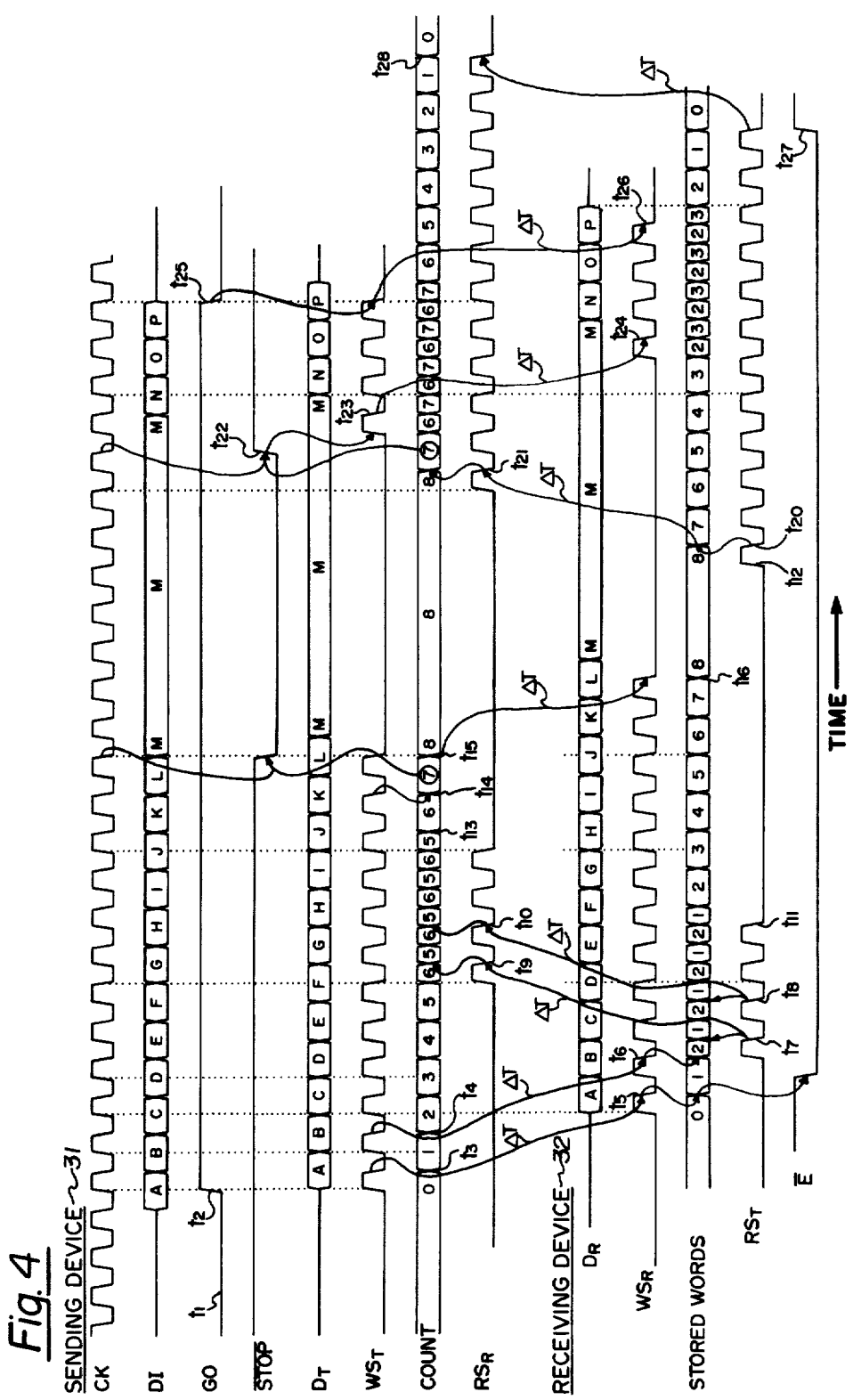
FIG. 4 is a timing diagram illustrating the operation of the system of FIG. 3.

Reference should now be made to FIG. 4 where the detailed timing of the signals generated by these components is illustrated. In FIG. 4 (and also FIG. 3) the subscript T on a signal indicates that the signal occurs at a transmitter input; while the subscript R on a signal indicates that the signal occurs at a receiver output. For example, symbol $D_T$ indicates data signals at the input of transmitter 43; and symbol $D_R$ indicates data signals at the output of receiver 52.

Initially in FIG. 4, a transmitter-generated GO signal is low, which indicates no data words are to be transmitted. This is indicated at time instant T1. Also in this initial state, the receiving queue is empty; both of the ring counters 46d and 46e are reset, and the $\overline{Q}$ side of flip-flop 46c is high.

Thereafter, data transmission is initiated by signal GO going high. This low to high transition is synchronized with the rising edge of clock signal CK as illustrated at time instant T2. By comparison, data words $D_I$ to be transmitted are presented in synchronization with the falling edge of clock signal CK; and the first word A to be transmitted is presented one-half clock cycle before the low to high transition of signal GO.

Data signals $D_I$ are latched in register 41 on the rising edge of clock signal CK. Thus, data signals $D_T$ at the input of transmitters 43 are delayed one-half clock cycle from the data signals $D_I$. This delay places the falling edge of the write strobes $WS_T$ in the center of transmitted data signals $D_T$. And since the falling edges of the write strobes are utilized to load data into queue 51, nearly one-half cycle of skew is permitted to occur in the transmitters, bus, and receivers.

Each write strobe $WS_T$ that is sent to the receiving device is also utilized in the sending device to shift ring counter 46d by one stage. This is illustrated in FIG. 4 by a waveform labeled COUNT. Waveform COUNT is the number of write strobes which ring counter 46d has received minus the number of response strobes which ring counter 46e has received. Thus, at time instant T3, COUNT goes from zero to one in response to the falling edge of the write strobe that accompanies data word A; at time instant T4 COUNT goes from one to two in response to the falling edge of the write strobe that accompanies data word B; etc.

After signals $D_T$ and $WS_T$ pass through their respective transmitters and propagate along bus 33 and pass through their respective receivers, they generate signals $D_R$ and $WS_T$. This occurs over a time interval $\Delta T$ which is larger than the period of clock CK. Thus, the delay through the transmitter, the bus, and the receivers does not limit the maximum rate at which words are transmitted on the bus.

In fact, as illustrated in FIG. 4, two clocks occur in the time interval $\Delta T$. Thus, one word is at the transmitter inputs in the sending device while at the same time instant a different word is at the receiver outputs in the receiving device. Of course, the time interval $\Delta T$ need not always be two clock cycles long, and can be any length.

In the receiving device, data words $D_R$ are loaded into queue 51 on the falling edge of strobe signal $WS_R$. Thus, as illustrated in FIG. 4, word A is loaded into queue 51 at time instant T5; word B is loaded into queue 51 at time instant T6; etc. Also in FIG. 4, a waveform labeled STORED WORDS indicates the total number of words in the queue.

After a word is loaded in queue 51, signal $\overline{E}$ goes low to indicate that the queue is not empty. This signal is monitored by the receiving device to determine when data may be taken from the queue. Thereafter, when a word is removed, the receiving device transmits a response strobe $RS_T$ back to the sending device.

In FIG. 4, signal $RS_T$ occurs for words A and B at time instants T7 and T8 respectively. And since at those time instants words A and B are no longer in the queue, the number in the waveform labeled STORED WORDS is decremented as illustrated. Then after time interval $\Delta T$, signal $RS_R$ occurs in the sending device. And that signal shifts ring counter 46e; which in turn causes the number in the COUNT waveform to be decremented as illustrated at time instants T9 and T10.

Prior to time instant T9 the COUNT signal had incremented to six. This number reflects the total number of words that were sent by the sending device prior to receiving the first response strobe from the receiving device. Then upon receipt of the first response strobe at time instant T9, COUNT is decremented from six to five. Thereafter, the COUNT continues to be incremented to six and decremented to five in an alternating fashion as long as the sending device keeps sending words and the receiving device keeps removing words from its queue.

Suppose however that the receiving device temporarily stops removing words from its queue. This is illustrated in FIG. 4 as occurring between time instants T11 and T12. In that case, the COUNT signal is incremented by signal $WS_T$, but there are no $RS_R$ signals to decrement it. Thus, the COUNT signal increments from five to six at time instant T13, from six to seven at time instant T14, and from seven to eight at time instant T15.

This incrementing continues until comparator 46f detects the COUNT signal is seven. When that occurs, comparator 46f sends a high signal to AND gates 46a and 46b. That in turn generates a high signal on the set input of flip-flop 46c, since signal $\overline{STOP}$ is also high. Thus, flip-flop 46c sets on the next falling edge of the clock signal, which occurs at time instant T15.

With flip-flop 46c set, further write strobe signals $WS_T$ are inhibited because signal $\overline{STOP}$ is an input to AND gate 44. This inhibiting operation prevents additional words from being sent, which in turn prevents the queue in the receiving device from being overloaded.

It is important to realize that this overload condition is detected in the transmitting device without having to actually send the last word to the receiving device and wait for response from it. Note from FIG. 4 that word L (which is the last word sent) is not even loaded into the receiving device's queue until time instant T16 which occurs two clock cycles after the sending device detected the full queue condition. If a response for the last word was required, speed of transmission would have to be greatly reduced because as was described above, the time to send one word and receive the corresponding response exceeds four clock cycles.

Transmission of further words remains inhibited until the receiving device resumes taking words from its queue. This is illustrated in FIG. 4 as occurring at time instant T20. There, the receiving device reduces the number of words in its queue from eight to seven and sends a response strobe back to the sending device.

After a time delay of $\Delta T$, that response strobe reaches the sending devie as signal $RS_R$. This is illustrated as occurring at time instant T21. Then in response to signal $RS_R$, the COUNT in control circuit 46 is decremented from eight to seven.

That COUNT of seven is detected by comparator 46f which generates a high signal on AND gates 46a and 46b. And, since signal $\overline{STOP}$ is also high, the reset input to flip-flop 46c is enabled. Accordingly, signal STOP goes high on the next low to high transition of the clock signal. This is illustrated as occurring at time instant T22.

With signal $\overline{STOP}$ being high, further write strobes are permitted to pass through AND gate 44. Thus, beginning at time instant T23, additional write strobes and data words are sent by the sending device to the receiving device. After time interval $\Delta T$, the word that was sent at time instant T23 is loaded into queue 51 in the receiving device. That occurs at time instant T24.

Thus, at T24, the number of words in the queue 51 is incremented by one. Note that even though the receiving device was continuously removing words from queue 51 from T20, the queue never emptied prior to T24. Thus, the operation of the receiving device was not affected by the relatively long delay between the removal of one word from the queue and the sending of another word to fill the vacancy.

Consider now the sequence that occurs when the sending device has no more words to send. This is signified by signal GO going low in synchronization with the trailing edge of word P. This is illustrated in FIG. 4 as occurring at time instant T25. With signal GO being low, further write strobes are inhibited by AND gate 44.

After the delay of $\Delta T$, the write strobe corresponding to the last word (i.e., word P in FIG. 4) is received in the receiving device. This occurs at time instant T26. Thereafter, the receiving device continues to remove words from its input queue 51 until the queue is emptied. An empty queue is then indicated to the receiving device by signal $\overline{E}$ going high. This is illustrated in FIG. 4 at time instant T27.

Then after the time delay of $\Delta T$, the last response strobe is received in the sending device. That response strobe causes the COUNT signal to be decremented from one to zero. This is illustrated as occurring at time instant T28. And at that point, both the sending device and reciving device are back in their initial states.

One preferred embodiment of the invention has now been described in detail. In addition, however, many changes and modifications can be made to the above details without departing from the nature and spirit of the invention. For example, the number of words in queue 51 and the number of stages in ring counters 46d and 46e need not equal eight; but instead they can be any number N greater than 2.

Preferably, N is chosen such that N divided by the maximum rate at which words are sent to the receiving device is greater than the minimum time required for sending one word to the receiving device and receiving the corresponding response strobe back in the sending device. In other words, with reference to FIG. 4, preferably N divided by frequency of the write strobe is greater than the time interval between time instants T3 and T9. This insures that the system can reach a state where the sending device is transmitting words at its maximum rate while the receiving device is simultaneously removing words from the queue at its maximum rate. Thus, neither device has to stop to wait for the other device.

Also as another modification, all of the components in the sending device may be incorporated in the receiving device and vice versa. Then, during one time interval, device 31 can send words to device 32; while during another time interval, device 32 can send words to device 31. This is implied in FIG. 3 by showing each bus transmitter with a corresponding receiver, and each bus receiver with a corresponding transmitter.

When both devices are constructed to have sending and receiving capability, some of the logic that is used to send words can be shared with logic that is used to receive words. This is illustrated in FIG. 5 wherein ring counters 46d and 46e are constructed as a portion of queue 51.

Figure 5:
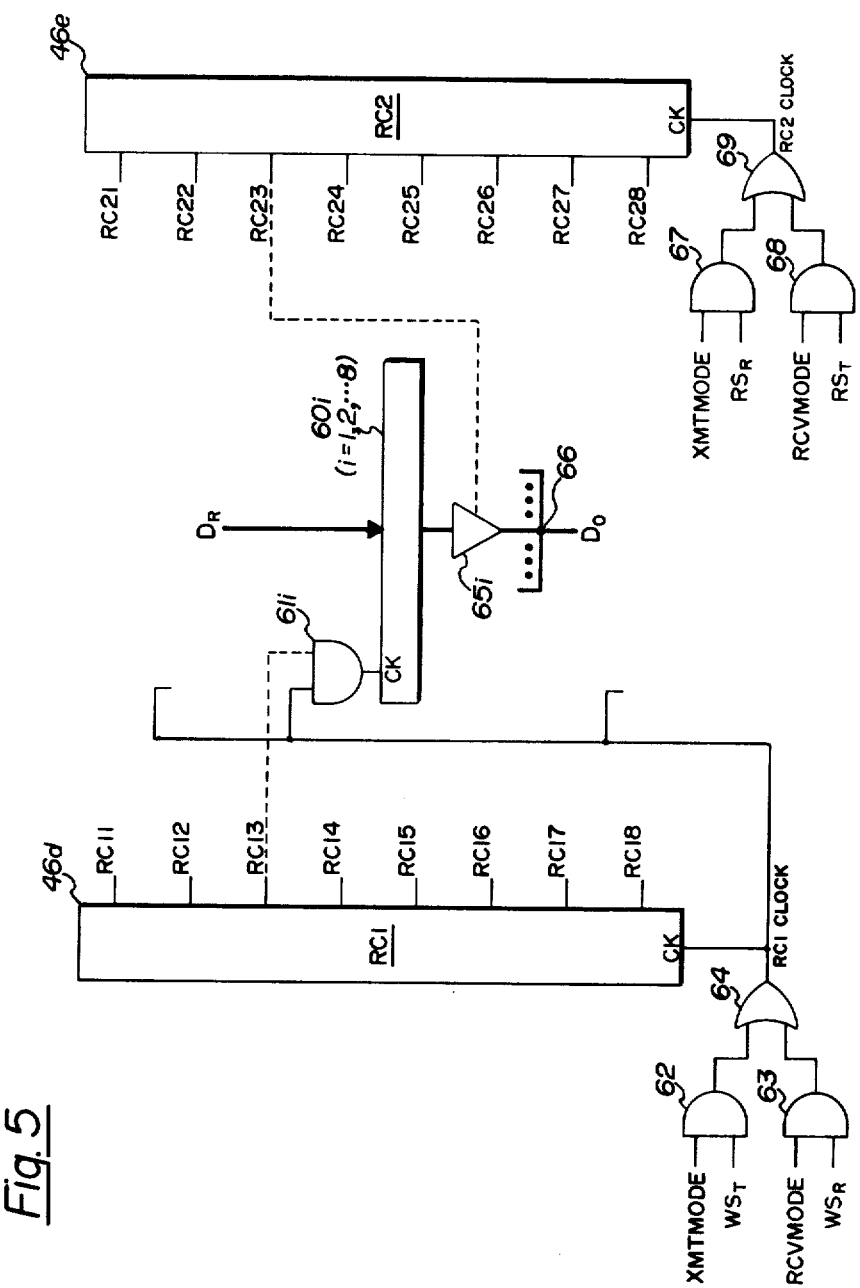
FIG. 5 is a logic diagram of one preferred embodiment for the queue and ring counters in the system of FIG. 3.

In the queue of FIG. 5, eight registers are provided for storing eight words of data; but for simplicity, only the ith one of these registers 60i is illustrated. Associated with each register is an AND gate 61i. It clocks data into register 60i; and the inputs to that AND gate are the clock for ring counter 46d and a selected output from the ring counter.

Logic gates 62, 63, and 64 generate the clock for ring counter 46d such that in a transmit mode, signal $WS_T$ forms the ring counter's clock; whereas in a receive mode, signal $WS_R$ forms the ring counter's clock. This is consistent with the preceding description of FIGS. 3 and 4.

Also, associated with each of the registers 60i is a plurality of WIRE-OR gates 65i. Respective gates exist for each bit in each register. And outputs of corresponding bits of all eight of the registers are WIRE-ORed together to form the queue's data output signals $D_0$ as indicated by reference numeral 66.

All of the gates 65i for one register 60i are enabled by a selected output of ring counter 46e. And clocking signals fr ring counter 46e are generated by logic gates 67, 68, and 69 such that in a write mode, ring counter 46e is clocked by signal $RS_R$ whereas in a receive mode, ring counter 46e is clocked by signal $RS_T$. Again this is consistent with FIGS. 3 and 4.

Having described various preferred embodiments of my invention, I now claim:

1. A digital system including:

a data bus;

a sending means coupled to said bus for transmitting words over said bus, and for generating a control signal which is not transmitted over the bus as each word is transmitted;

a receiving means, coupled to said bus at a location remote from said sending means, having a storage means with a predetermined storage capacity of greater than one word for storing said transmitted words after they have propagated over said bus;

a means, located at said receiving means, for sending a response signal over said bus whenever a word is removed from said storage means; and a control means, located at said sending means for receiving said control signal without any propagation delay over said bus, for receiving said response signal after it has propagated over said bus, and for inhibiting said sending means from transmitting words over said bus whenever the number of received control signals minus the number of received response signals equals said predetermined storage capacity.

2. The system of claim 1 wherein the number of words that said storage means can temporarily store divided by the maximum rate at which said sending means sends words to said receiving means is greater than the minimum time required for sending one word from said sending means to said receiving means and receiving said response signal in said sending means indicating said one word has been removed from said storage means in said receiving means.

3. The system of claim 1 wherein said sending means and said receiving means are spaced apart on said bus by a distance which enables one word to be on said bus at said sending means while at the same instant another word is on said bus at said receiving means.

4. The system of claim 1 wherein said control means includes a first ring counter means for counting the number of words sent by said sending means and a second ring counter means for counting the number of response signals from said receiving means.

5. The system of claim 1 wherein said response signal is a pulse.

6. The system of claim 1 wherein said storage means is a first-in first-out queue.

7. The system of claim 1 wherein said sending means sends words on said bus at a sending rate, and said receiving means removes words from said storage means and sends said response signals indicating the same at another rate that is at least as fast as said sending rate.

8. The system of claim 1 wherein said sending means sends words on said bus at a sending rate, and said receiving means removes words from said storage means and sends said respose signals indicating the same at another rate that is slower than said sending rate.

9. The system of claim 1 wherein said words from said sending means and said response signals from said receiving means are sent on said bus asynchronously with respect to each other.

* * * * *